United States Patent
Windhorn

[11] Patent Number: 6,093,986
[45] Date of Patent: Jul. 25, 2000

[54] METHOD AND APPARATUS FOR POWERING SHAFT-MOUNTED SENSORS ON MOTORS AND GENERATORS

[75] Inventor: Allen Windhorn, Kasota, Minn.

[73] Assignee: Emerson Electric Co., St. Louis, Mo.

[21] Appl. No.: 09/262,891

[22] Filed: Mar. 8, 1999

[51] Int. Cl.[7] .......................... H02K 11/00; H02K 16/00; H02K 21/04

[52] U.S. Cl. ...................... 310/68 B; 310/68 R; 310/114; 310/181

[58] Field of Search ................................ 310/68 R, 68 B, 310/112, 114, 181; 324/207.25; 322/99

[56] References Cited

U.S. PATENT DOCUMENTS 5,753,989  5/1998  Syverson et al. ....................... 310/114
5,864,198  1/1999  Pinkerton ................................ 310/112

Primary Examiner—Clayton LaBalle

[57] ABSTRACT

A shaft-mounted electronic sensor with an independent, rotating power supply, and a method for powering shaft-mounted electronic sensors by harnessing the energy present in the residual magnetic fields present in the permanent magnet armature windings of a generator or motor. Windings are placed on the shaft of a rotating machine such as a synchronous motor or generator that uses a permanent magnet generator for supplying exciter field power via a regulator. These windings are placed such that they rotate with the shaft and break the lines of flux produced in the permanent magnet stationary armature windings. Breaking the lines of flux induces a current in the windings of the invention which is used to power an electronic sensor mounted on the shaft.

11 Claims, 3 Drawing Sheets

METHOD AND APPARATUS FOR POWERING SHAFT-MOUNTED SENSORS ON MOTORS AND GENERATORS

BACKGROUND OF THE INVENTION

This invention relates generally to harnessing the energy present in the residual magnetic fields present in the armature windings of a generator or motor and using it to power electronic equipment carried by the rotating shaft of the generator or motor. Often it is desirable to mount electronic equipment on the shaft of the rotor of an electrical generator or motor to measure parameters associated with the rotor. This electronic equipment can be used for a variety of diagnostic, data-gathering purposes including, inter alia, ground fault detection and measuring rotor temperature, rotor voltage or rotor current.

Simple electrical generators utilize field windings formed of wire coils mounted on spokes fixed to and positioned radially about the shaft of the generator to define the rotor. These windings have current flowing through them in order to establish a magnetic field. A stationary stator surrounds the field windings of the rotor and includes armature windings. When the shaft is rotated, the magnetic field produced by the field windings interacts with the armature windings, inducing an electrical current in the armature windings, which are electrically connected to the load to which the generator is supplying current. A portion of the armature currents is tapped from the armature windings, rectified into a direct current (DC) and fed back to the field windings of the rotor via slip rings to provide the necessary current to generate the magnetic field. When the generator is initially started, there is no current flowing in the rotor field windings and, therefore, no magnetic field. An initial excitation current must be supplied to the field windings to create an initial magnetic field. This is known as "flashing the field." This initial magnetic field can then interact with the armature windings to induce a current in the armature windings, some of which current is fed back to provide a main source of current to the rotor field windings, replacing the excitation source. Excitation current is often supplied by a smaller, permanent magnet generator (PMG) consisting of permanent magnets mounted on spokes which extend radially from the shaft of the main generator and another set of armature windings in which the excitation current is induced.

Modern, medium to large state of the art generators are more complicated and can, as described below utilize three machines mounted to a common shaft. The first is the main alternator which generates the main output power in its stationary armature windings for use by the end user. The second machine mounted to the shaft is a brushless exciter which supplies the current to the alternator's rotor field windings to create the rotor's magnetic field. The brushless exciter has stationary electromagnetic field windings and rotating armature windings which break the lines of flux of the stationary field, thereby inducing a current in the rotating armature windings which is fed via a rectifier, also mounted on the shaft, to the main alternator's rotor field windings to create the alternator rotor's magnetic field. Use of the brushless exciter on the common shaft obviates the need for slip rings or brushes which are prone to wear and degradation. The third machine attached to the shaft is a standard PMG which has a rotating magnetic field created by permanent magnets which rotate in close proximity to a stationary armature. This permanent magnet generator creates the electrical current needed to create the stationary magnetic field in the stationary windings of the brushless exciter. The current is provided to the exciter via a voltage regulator incorporating a silicon controlled rectifier or other solid state devices.

In operation, electricity is produced in these modern generators by rotating the common shaft of the generator by a motor apparatus such as a gas-turbine engine, diesel engine, or steam turbine thereby causing the moving magnets of the PMG to create a current in the PMG stationary armature. This current passes through a voltage regulator which ensures that appropriate current is fed to the field windings of the brushless exciter in order to maintain a constant generator output voltage. The lines of flux of the exciter's stationary field are broken by the windings of its rotating armature. The alternating current induced in the windings of the exciter's armature is converted to direct current via a rectifier and fed to the rotating field windings of the main alternator, thereby creating a rotating magnetic field. The rotating lines of flux of this field pass over the stationary armature windings of the main alternator, producing electric power which is fed to the end user.

Mounting sensors on the shaft of a generator or motor is known. However, because these sensors are mounted on the spinning shaft of the generator or motor, providing a reliable, steady electrical current to the sensors has presented problems that the prior art methods have failed to adequately overcome. The prior art provides three ways of providing power to shaft-mounted electronic equipment.

One solution the prior art provides is to tap power directly from the field windings. Because the field windings are rotating with the sensors, this solution overcomes the problem of providing an electrical connection between a stationary circuit and a rotating circuit. However, the voltages generated in the field windings typically range from 30 to 2500 volts. Devising a circuit that is able to power a delicate sensor with such a widely varying voltage source can be difficult and expensive. Furthermore, during a fault, the field windings often experience very high voltage transients which can easily damage delicate electronic equipment.

A second solution incorporates a rotary transformer to make the electrical connection between a stationary power source and the rotating circuit feeding the shaft-mounted sensors. Rotary transformers provide the option of tapping power from the armature windings or using independent, reliable power sources. Though using rotary transformers overcomes the problems associated with using power from the field windings, these transformers are expensive, delicate, and difficult to install and align. Furthermore, due to their delicacy, the amount of power that can be drawn through these transformers is limited.

A third solution is to use slip rings in place of rotary transformers. Slip rings are a mechanical means to perform the same function as rotary transformers. They are much cheaper and less delicate than rotary transformers, and are relatively easy to install and align. However, due to their mechanical nature and the high speeds at which generator and motor shafts typically operate, slip rings are prone to wear and can be unreliable. Also, unlike rotary transformers, slip rings do not isolate the rotating circuit from the stationary circuit, leaving the shaft-mounted sensors vulnerable to spikes and surges.

There is a need to provide a power source for shaft-mounted electronic sensors that is reliable, relatively constant, and inexpensive. Preferably this power source should rotate with the generator shaft and should be isolated from the load to which the main alternator is connected.

BRIEF SUMMARY OF THE INVENTION

It is a primary object of this invention to provide an apparatus which allows a shaft-mounted electronic sensor to be powered by a source which rotates with the sensor.

It is another object to provide an apparatus which allows a shaft-mounted electronic sensor to be powered by a source which is isolated from the field windings of the main alternator.

It is a further object to provide an apparatus which allows a shaft-mounted electronic sensor to be powered by a source which is reliable, inexpensive, and easy to install.

It is yet another object to provide a method of powering a shaft-mounted electronic device harnessing magnetic flux energy due to the armature reaction of a single phase generator.

It is also an object to provide a method of powering a shaft-mounted electronic device by harnessing magnetic flux energy due to slot pitch harmonics in a multi-phase generator.

It is a further object to provide a method of powering a shaft-mounted electronic device by harnessing magnetic flux energy due to the action of silicon controlled rectifier loads in a voltage regulator powered by a permanent magnet generator.

The instant invention relates to an apparatus for powering an electrically energizeable remote sensor having input terminals and comprises placing auxiliary windings on the rotor array of a rotating machine such as a synchronous motor or generator that uses a permanent magnet generator for supplying exciter field power to the regulator. These windings are such that they rotate with the rotor array around its longitudinal axis and break the lines of flux produced in either the permanent magnet armature windings due to simple armature reaction, or the lines of flux created by harmonics due to non-sinusoidal flux distribution or tooth and slot effects. Breaking the lines of flux induces a current in the windings of the invention, and this induced current is used to power an electronic sensor mounted on the shaft. Preferably, these windings are placed around the magnetic poles which radiate from the shaft and rotate within the armature windings. Each magnetic pole will utilize a permanent magnet oriented radially to the shaft. The permanent magnets can be mounted on the shaft in a variety of ways. Often, the magnets have a central aperture which extends the entire length of the magnet. A bolt is passed through the central aperture and anchored into the shaft. An end cap formed of magnetic material is used to cover the outer end of the bolt. The windings would then be wrapped around the outer perimeter of the magnets. Alternatively, the windings could be wrapped around spokes that contain no magnets or, the spokes could be longer than the magnets so as to permit the windings to be wrapped directly around the spokes and stacked either radially inward or radially outward of the magnets. Alternatively, more powerful magnets can be used as the end caps, obviating the need for the above described radially positioned magnet. These more powerful magnet end caps can be mounted at the end of spoke-like bolts, or more preferably, glued directly to the shaft. In the case of the more powerful magnet end caps glued directly to the shaft, the windings could be placed in slots cut into the shaft and surrounding the magnets. It is envisioned that these output windings are connected to a circuit having a bridge rectifier and a filter as well as the shaft-mounted electronic equipment.

DESCRIPTION OF THE PREFERRED EMBODIMENTS

Figure 1:
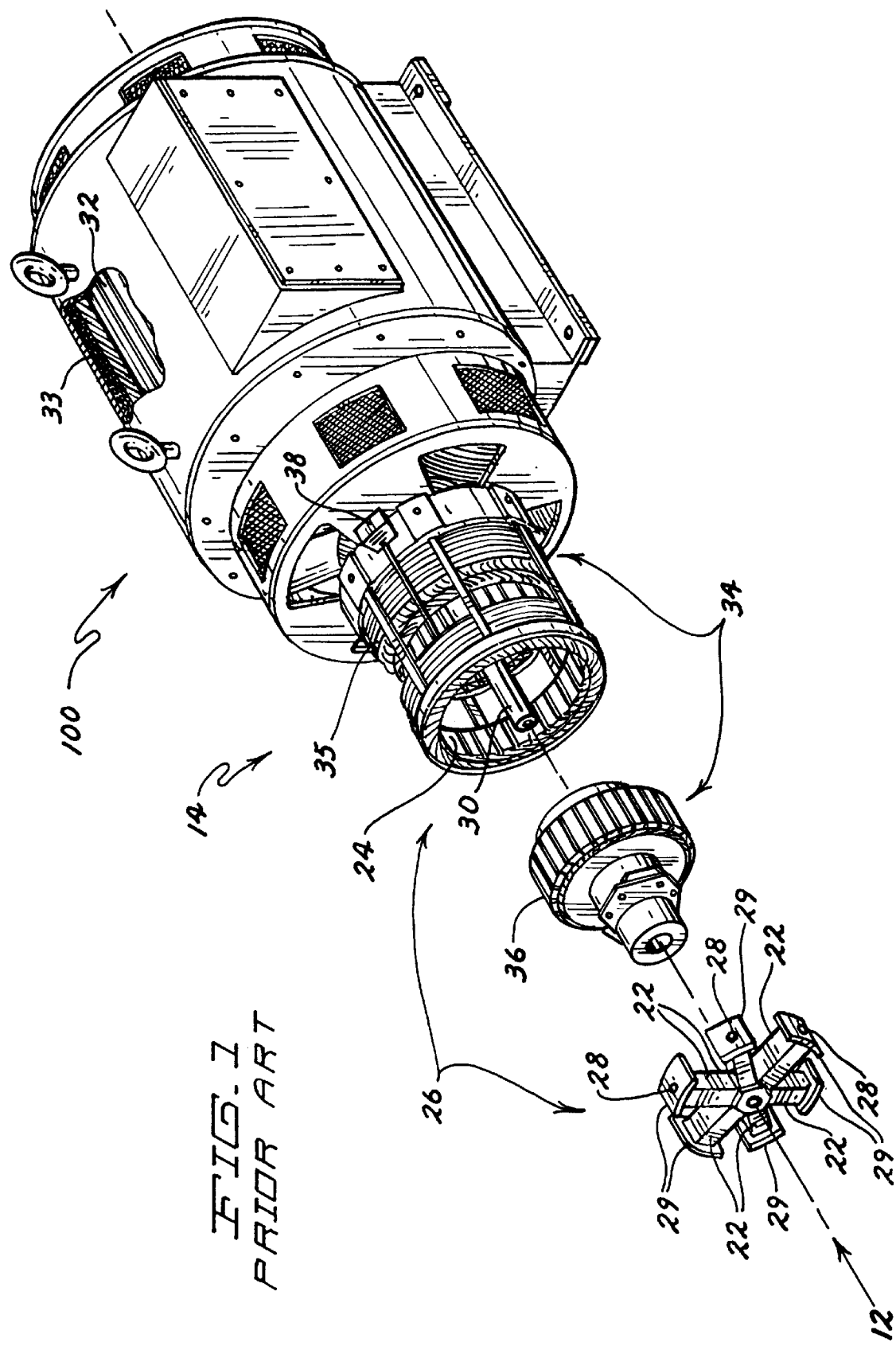
FIG. 1 is a perspective, partially exploded view of a typical generator with a permanent magnet generator for supplying voltage regulator power and a brushless exciter used to supply field flashing power.

With reference to FIG. 1 of the drawings there is shown a typical generator/motor 100 with a permanent magnet generator 26 used to supply power to the voltage regulator 38 and to the stationary field windings 35 of the brushless exciter 34. Though the figure does not show the present invention, it provides an example of the type of equipment for which the present invention is intended. Although the generator/motor 100 shown in the drawing is a generator, the present invention may also be used with an electric motor having a similar configuration.

A typical generator/motor 100 comprises a rotor array 12 and a stator assembly 14. The rotor array 12 is herein defined to include any part of the generator/motor 100 that rotates and can include more than one rotor, so long as the rotors are coaxial or connected or arranged relative to each other for common rotation. The stator array 14 is herein defined to include any part of the generator/motor 100 that is stationary.

Spokes 28 are attached to and radiate outwardly from the shaft 30 of the rotor array 12. Permanent magnets 22 are mounted on the spokes 28, thereby surrounding the spokes 28 and are held in place with end caps 29. The permanent magnets are surrounded by, and in close proximity to, permanent magnet armature windings 24 which are part of the stator assembly 14.

In the case of a generator, as the shaft 30 turns, the magnets 22 rotate concentrically within the permanent magnet armature windings 24 and induce an electric current therein. This current is supplied to a load which can include the stationary field windings 35 of brushless exciter 34, in the case of a modern state of the art generator like the one shown in FIG. 1, or simply the main field windings 32 of the rotor array 12. If a brushless exciter 34 is used, the current supplied to the stationary field windings 35 via voltage regulator 38, creates a magnetic field through which the rotating armature windings 36 of brushless exciter 34 pass, thereby inducing an electric current which is supplied to the generator's main rotating field windings 32. The main rotating field windings 32 rotate in close proximity to the main armature windings 33 and induce the electricity which is supplied to the end user. In addition to the functional electromagnetic relationships described above, other magnetic fields are produced as a natural result of current flowing through a conductor. For instance, as electric current flows through the permanent magnet armature windings 24, a second magnetic field is produced around these windings. Utilization of this field relates to the present invention and will be described in more detail below.

Referring again to FIG. 1, when a permanent magnet machine is designed to be used as a motor, the motor/generator 100 has a rotor array 12 with a shaft 30 and spokes 28 which carry permanent magnets 22 held in place with end caps 29. This rotor array 12 also rotates concentrically within, and in close proximity to, permanent magnet armature windings 24 of stator assembly 14. However, instead of inducing a current in the armature windings 24 by providing rotational power to the rotor array 12, electrical power is supplied to the armature windings 24 from an outside source such as a battery, a generator, or commercial power. As the current supplied by this electrical source flows through the armature windings 24 of the stator assembly 14, a magnetic field is induced therein. This magnetic field is manipulated by varying the current to each of the armature windings 24 sequentially in order to create a rotating magnetic field used to magnetically influence the permanent magnets 22 of the rotor array 12, thereby turning the rotor array 12.

Figure 2:
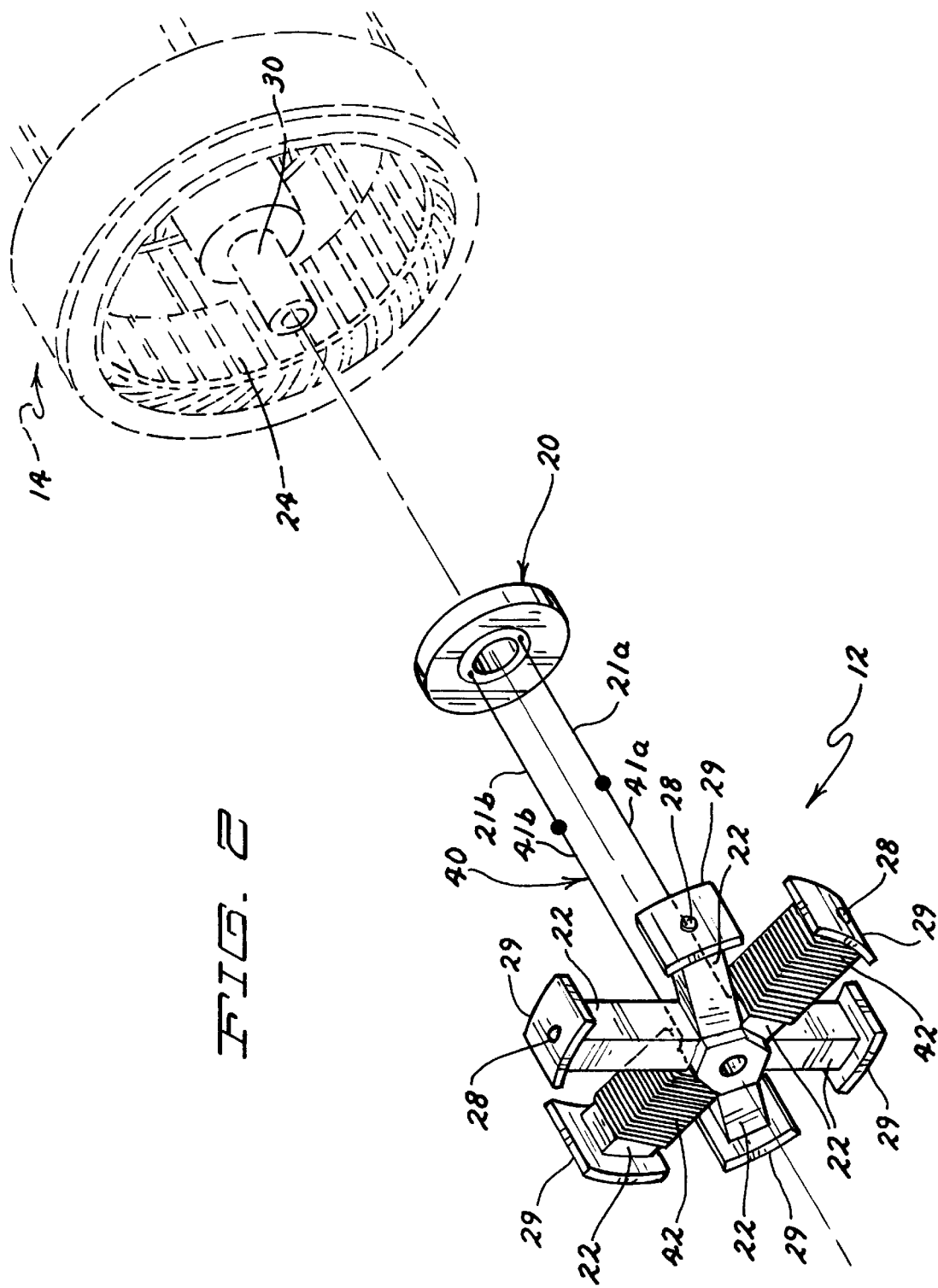
FIG. 2 is a close up perspective view of a permanent magnet generator with an electronic sensor mounted on the shaft and powered by windings of the resent invention.

FIG. 2 illustrates how the present invention utilizes the magnetic field produced around the permanent magnet stationary armature windings 24 to power an electronic sensor 20, with leads 21a and 21b, mounted on the rotor array 12. There is shown a wire 40 wrapped around at least one of the permanent magnets 22 mounted on the rotor shaft 30, thereby forming series connected coils 42. The ends of the wires form output terminals 41a and 41b. This wire 40 is preferably wrapped around opposing pairs of magnets an equal number of times such that the weight of the rotor remains balanced. The output terminals 41a and 41b are electrically connected to input terminals 21a and 21b of shaft-mounted electronic sensor 20 forming at least part of circuit 50, shown in FIG. 3, used to power sensor 20.

Though the coils 42 are shown wrapped around the permanent magnets 22, a wide variety of mounting configurations are possible. For instance, it is envisioned that the wires could be wrapped around spokes 28 which do not have magnets mounted on them. In other words, there could be spokes placed between magnets for holding coils. Alternatively, magnets 22 may be relatively flat and conform to the shaft 30 such that they may be glued directly to the shaft 30. In this case, there may not be enough radial space on the magnets 22 to receive coils 42. It is envisioned that grooves would then be cut into shaft 30 and around magnets 22 to receive coils 42. Yet another possible configuration includes spokes 28 having magnets mounted on them which are shorter than the spokes 28, such that a length of spoke remains exposed around which the coils 42 may be wrapped, the coils then being held in place by end caps 29. Alternatively, the coils 42 could be wrapped around the end caps 29 themselves. The location of the coils 42 may vary so long as the coils 42 break sufficient lines of magnetic flux to induce an adequate current in the coils 42 to power the sensor 20.

Figure 3:
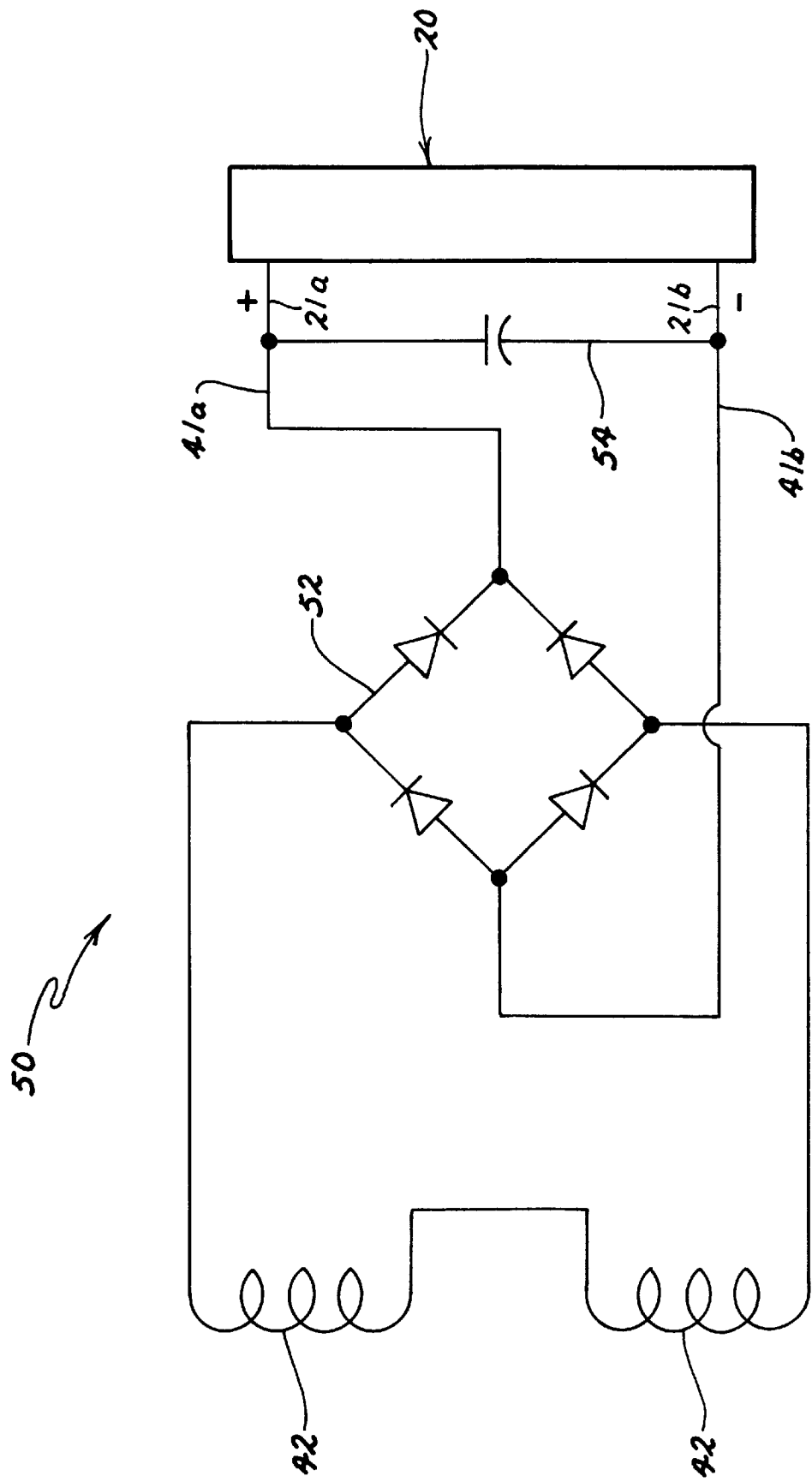
FIG. 3 is a circuit diagram of the present invention.

FIG. 3 shows an embodiment of circuit 50 of the present invention comprising the coils 42, supplying power to leads 21a and 21b of shaft-mounted electronic sensor 20 via a bridge rectifier 52 and a filter 54. This circuit is just one example of the many possible circuits that could be utilized with the power source of the present invention.

In operation, the coils 42 rotate with the magnets 22 within the permanent magnet armature windings 24. The magnets 22 induce a current in the windings 24 and the windings 24 then create their own secondary magnetic fields. The coils 42 break through the lines of flux of these secondary magnetic fields as they rotate with the rotor array 12 and a current is induced in the wire 40 which is supplied to the circuit 50.

While the preferred embodiments have been described in detail with reference to the attached drawing figures, it is understood that various changes and adaptations may be made to the described embodiments without departing from the spirit and scope of the present invention which is intended to be limited in scope only by the following claims:

What is claimed is:

1. In combination with an electrically energizeable remote sensor having input terminals, an apparatus for powering said sensor comprising:

a stationary armature having at least one armature winding capable of generating a magnetic field when electrical current flows in said armature winding and capable of inducing an electric current when influenced by a passing magnetic field;

a rotor array positioned adjacent said armature, said rotor array including at least one permanent magnet;

said rotor array having a longitudinal axis, and said rotor array being mounted for rotation relative to said armature and about said axis;

said permanent magnet being constructed and arranged to produce a first magnetic field extending to and interacting with said armature winding of said stationary armature and cooperating with said armature winding so as to generate a first current in said armature winding when said rotor array turns about said axis and to cause said first current in said armature winding to generate a secondary magnetic field interacting with said rotor array;

an auxiliary winding positioned on said rotor array for interaction with said secondary magnetic field during rotation of said rotor array so as to induce a second current in said auxiliary winding, said auxiliary winding including output terminals;

said sensor being mounted on said rotor array to rotate about said axis; and said output terminals of said auxiliary winding being electrically connected to said input terminals of said sensor to energize said sensor.

2. The combination of claim 1 wherein said auxiliary winding is wound around said permanent magnet.

3. The combination of claim 1 wherein said rotor array includes at least two permanent magnets and wherein said auxiliary winding is wound about at least two permanent magnets with said auxiliary winding being positioned on opposite sides of said axis to achieve balancing of said rotor and said auxiliary winding.

4. The combination of claim 1 and further including a plurality of mounting spokes on said rotor extending radially from said axis and said auxiliary winding being wound about at least one of said mounting spokes.

5. The combination of claim 1 wherein said rotor array comprises a plurality of coaxial rotors fixed relative to each other for common rotation, said auxiliary winding being mounted on a first rotor and said sensor being mounted on a second rotor.

6. In combination with an electrically energizeable remote sensor having input terminals, an apparatus for powering said sensor comprising:

a stationary armature having at least one armature winding capable of generating a magnetic field when a first electrical current flows in said armature winding;

a rotor array positioned adjacent said armature, said rotor array including at least one permanent magnet;

said rotor array having a longitudinal axis, and said rotor array being mounted for rotation relative to said armature and about said axis;

said at least one permanent magnet being constructed and arranged to be rotated by the magnetic field generated in said armature winding, thereby rotating said rotor array about said axis;

an auxiliary winding positioned on said rotor array for interaction with said magnetic field during rotation of said rotor array so as to induce a second electrical current in said auxiliary winding, said auxiliary winding including output terminals;

said sensor being mounted on said rotor array to rotate about said axis; and said output terminals of said auxiliary winding being electrically connected to said input terminals of said sensor to energize said sensor.

7. The combination of claim 6 wherein said auxiliary winding is wound around said at least one permanent magnet.

8. The combination of claim 6 wherein said rotor array includes at least two permanent magnets and wherein said auxiliary winding is wound about at least two permanent magnets with said auxiliary winding being positioned on opposite sides of said axis to achieve balancing of said rotor and said auxiliary winding.

9. The combination of claim 6 and further including a plurality of mounting spokes on said rotor extending radially from said axis and said auxiliary winding being wound about said mounting spokes.

10. The combination of claim 6 wherein said rotor array comprises first and second coaxial rotors fixed relative to each other for common rotation, said auxiliary winding being mounted on a first rotor and said sensor being mounted on a second rotor.

11. A method for powering a sensor with input terminals to obtain data associated with a rotor array having a shaft mounted for rotation about an axis and within a stationary armature having a first armature winding, comprising the steps of:

attaching the sensor to the rotor array;

attaching at least one permanent magnet having a first magnetic field to the rotor array to rotate with the shaft;

using the first armature winding to establish a first magnetic field interacting with the rotor array;

positioning an auxiliary winding with output terminals on the rotor array substantially within the first magnetic field;

rotating the rotor array to induce a current in the auxiliary winding; and electrically connecting the output terminals of the auxiliary winding with the input terminals of the sensor to use the induced current to energize the sensor.

* * * * *